(12) United States Patent
Granovsky et al.

(10) Patent No.: US 11,900,146 B2
(45) Date of Patent: Feb. 13, 2024

(54) MEMORY CONTROLLER WITH SEPARATE TRANSACTION TABLE FOR REAL TIME TRANSACTIONS

(71) Applicant: Apple Inc., Cupertino, CA (US)

(72) Inventors: Ilya Granovsky, Kiryat Tivon (IL); Elli Bagelman, Haifa (IL)

(73) Assignee: Apple Inc., Cupertino, CA (US)

( * ) Notice: Subject to any disclaimer, the term of this patent is extended or adjusted under 35 U.S.C. 154(b) by 225 days.

(21) Appl. No.: 17/462,374

(22) Filed: Aug. 31, 2021

(65) Prior Publication Data

US 2023/0060508 A1   Mar. 2, 2023

(51) Int. Cl.
*G06F 9/46* (2006.01)
*G06F 13/16* (2006.01)
*G06F 9/50* (2006.01)

(52) U.S. Cl.
CPC ............ *G06F 9/467* (2013.01); *G06F 9/5016* (2013.01); *G06F 13/1605* (2013.01); *G06F 2209/5011* (2013.01)

(58) Field of Classification Search
CPC .... G06F 9/467; G06F 9/5016; G06F 13/1605; G06F 2209/5011
See application file for complete search history.

(56) References Cited

U.S. PATENT DOCUMENTS

| | | | |
|---|---|---|---|
| 6,011,798 A * | 1/2000 | McAlpine | H04L 12/5601 370/395.42 |
| 6,184,906 B1 * | 2/2001 | Wang | G06F 13/1615 711/158 |
| 8,312,229 B2 | 11/2012 | Bloks | |
| 8,510,521 B2 * | 8/2013 | Biswas | G06F 13/1642 711/149 |
| 9,626,307 B2 | 4/2017 | Kim | |
| 2003/0115239 A1 * | 6/2003 | Togawa | G06F 1/3293 718/100 |
| 2004/0117577 A1 * | 6/2004 | Bloks | G06F 9/4887 711/167 |

(Continued)

FOREIGN PATENT DOCUMENTS

CN         103678003 A   *   3/2014

*Primary Examiner* — Emerson C Puente
*Assistant Examiner* — Zhi Chen
(74) *Attorney, Agent, or Firm* — Kowert, Hood, Munyon, Rankin & Goetzel, P.C.; Erik A. Heter; Dean M. Munyon

(57) ABSTRACT

A memory controller with a separate transaction table for real-time transactions is disclosed. A system includes a plurality of agents and a memory controller configured to receive real-time and non-real-time memory requests from ones of the plurality of agents. The memory controller includes a real-time incoming transaction table configured to store those memory requests received from a subset of the plurality of agents that are real-time memory requests, and a non-real-time incoming transaction table configured to store those memory requests received from the subset of the plurality of agents that are non-real-time memory requests. The memory controller further includes an arbitration circuit configured to select a memory request from among memory requests stored in the real-time and non-real-time incoming transaction tables and further configured to enforce a quality of service policy for the real-time memory requests.

18 Claims, 5 Drawing Sheets

(56) References Cited

U.S. PATENT DOCUMENTS

| | | | |
|---|---|---|---|
| 2008/0049748 A1* | 2/2008 | Bugenhagen | H04M 15/51 370/389 |
| 2008/0052206 A1* | 2/2008 | Edwards | G06Q 30/04 705/34 |
| 2010/0011026 A1* | 1/2010 | Saha | G06F 16/00 707/E17.005 |
| 2011/0276979 A1* | 11/2011 | Isani | G01S 19/23 718/104 |
| 2013/0297906 A1* | 11/2013 | Loh | G06F 13/1642 711/E12.001 |
| 2014/0192801 A1* | 7/2014 | Machnicki | H04L 49/10 370/355 |
| 2016/0188529 A1 | 6/2016 | Nagarajan et al. | |
| 2016/0292592 A1* | 10/2016 | Patthak | G06F 16/2228 |
| 2019/0205164 A1* | 7/2019 | Kumar | G06F 9/4881 |
| 2020/0167097 A1 | 5/2020 | Huen et al. | |
| 2020/0192715 A1* | 6/2020 | Wang | G06F 12/0253 |
| 2021/0326169 A1* | 10/2021 | Chidambaram Nachiappan | G06F 13/1668 |

* cited by examiner

US 11,900,146 B2

MEMORY CONTROLLER WITH SEPARATE TRANSACTION TABLE FOR REAL TIME TRANSACTIONS

BACKGROUND

Technical Field

This disclosure is directed to computer systems, and more particularly, to mechanisms for tracking pending memory access requests in computer systems.

Description of the Related Art

Memory controllers are used in memory subsystems to control access to a system memory. Within a computer system, there may be a number of different entities that request read and/or write access to main system memory. Such entities include processor cores, graphics processors, various peripherals, and input/output devices. Some types of memory controllers may track the various access requests using transaction tables. The memory controller may include circuitry to select and arbitrate among the various requests stored in a transaction table, and carry out the winning requests.

SUMMARY

A memory controller with a separate transaction table for real-time transactions is disclosed. In one embodiment, a system includes a plurality of agents and a memory controller configured to receive real-time and non-real-time memory requests from ones of the plurality of agents. The memory controller includes a real-time transaction table configured to store those memory requests received from a subset of the plurality of agents that are real-time memory requests and a non-real-time transaction table configured to store those memory requests received from the subset of the plurality of agents that are non-real-time memory requests. The memory controller further includes an arbitration circuit configured to select a memory request from among memory requests stored in the real-time and non-real-time transaction tables and further configured to enforce a quality of service policy for the real-time memory requests.

In one embodiment, the memory controller includes a first selection circuit configured to select transactions from the real-time transaction table and a separate, second selection circuit configured to select transactions from the non-real-time transaction table. The first and second selection circuits present selected transactions to the arbitration circuit, which may then perform arbitration there between.

In various embodiments, the agents may be peripheral devices in the computer system. Transaction tables may also be implemented for at least one processor and at least one graphics processing unit (GPU). In some embodiments, the arbitration circuit may perform a credit-based arbitration, with the transactions from the processor, the GPU, and the non-real-time transactions from other agents sharing a pool of credits. The real-time transaction table may have its own pool of credits separate from those that are shared.

BRIEF DESCRIPTION OF THE DRAWINGS

The following detailed description makes reference to the accompanying drawings, which are now briefly described.

DETAILED DESCRIPTION OF EMBODIMENTS

Figure 1:
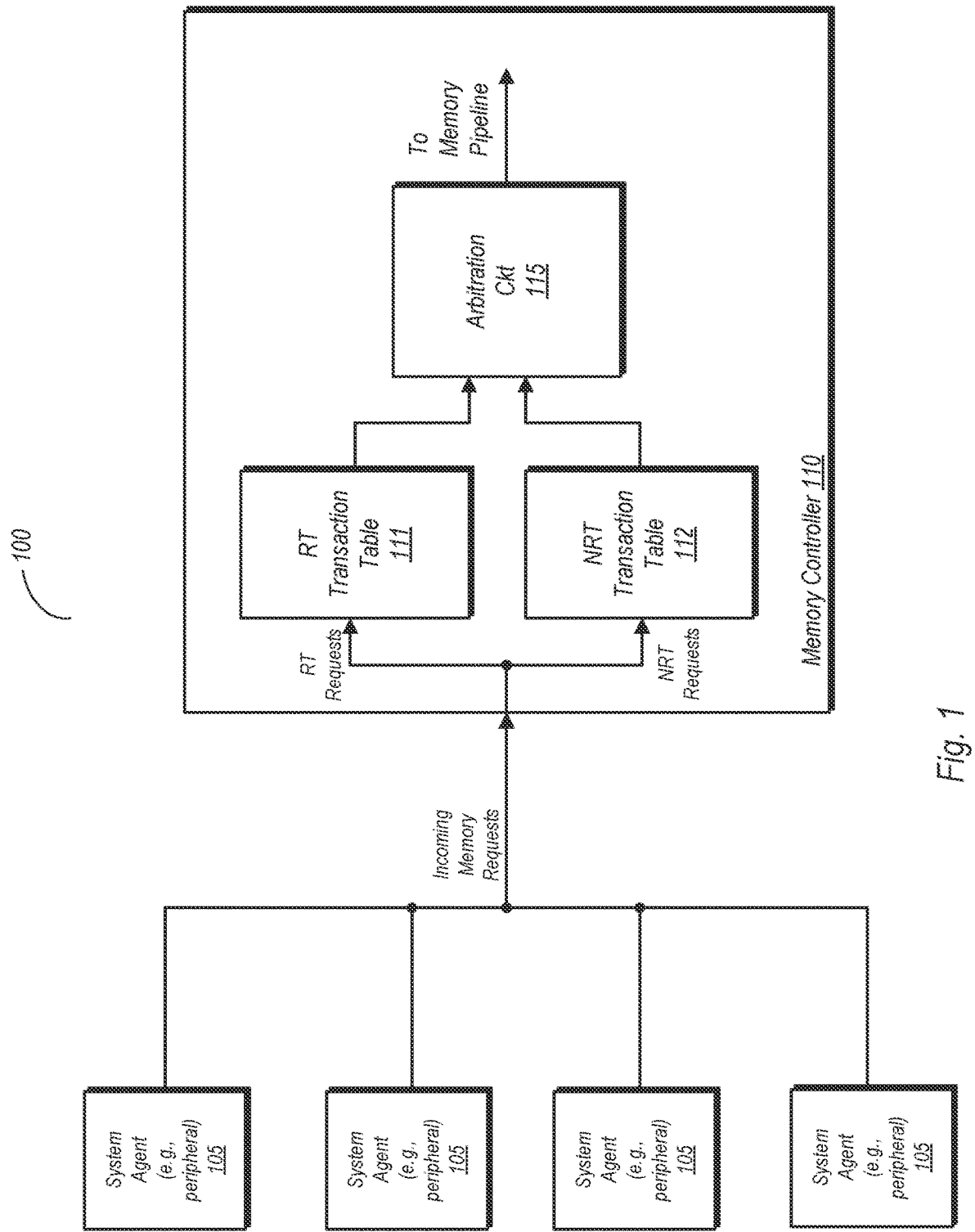
FIG. 1 is a block diagram of one embodiment of a memory controller coupled to receive memory transaction requests from a plurality of system agents.

The present disclosure is directed to a memory controller having separate transaction tables for real-time and non-real-time memory transactions. Utilizing the separate tables may allow for more efficient processing of memory transactions such that quality-of-service (QoS) requirements can be met for the real-time transactions.

Many memory controllers utilize transaction tables for tracking memory requests from various agents/circuits within a corresponding computer system. Such agents may include various peripheral devices, one or more general central processing units (CPUs), one or more graphic processing units (GPUs). Transaction requests (e.g., read and write requests from/to memory) coming into the memory controller may initially be stored in various ones of one or more transaction tables. For example, a transaction table may be provided for the one or more system CPUs, another may be provided for the one or more GPUs, and yet another provided for the various peripheral devices of the system. An arbitration circuit may arbitrate among transactions selected from the various transaction tables, with a winning transaction being executed in the memory pipeline.

The various types of transactions received by the transaction tables may have different QoS requirements. For example, some peripheral devices may submit real-time transaction requests that have strict QoS requirements relative to other transactions. However, storing such transaction requests in a transaction table along with non-real-time transactions may hamper the ability to meet these QoS requirements. Storing real-time and non-real-time transactions in the same transaction tables can also add complexity to logic circuitry that selects transactions to be presented for arbitration.

The present disclosure makes use of the insight that simplified logic for selecting transactions for arbitration could be achieved by storing the real-time transaction requests in a table separate from those that store non-real-time requests. Furthermore, separate selection logic circuitry can be provided for the various transaction tables, resulting in an overall simplification of such circuitry. Accordingly, the present disclosure is directed to an apparatus that provides a separate transaction table, along with separate logic circuitry, for real-time transactions. The real-time transactions are thus stored separately and not co-mingled with the non-real-time transactions. The non-real time transaction tables may also have their own separate logic circuitry for selecting transactions for arbitration. Transactions may be selected from each of the various transaction tables and presented to an arbitration circuit. The arbitration circuit may then select one of the presented transactions for further processing in a memory pipeline. The arbitration circuit may be further configured to enforce a QoS policy for the real-time transactions. Thus, while the arbitration may not always select a real-time transaction over non-real-time transactions, it may nevertheless prioritize real-time transactions when not doing so could cause the latency of the transaction to violate a corresponding QoS policy.

The present disclosure begins with the discussion of an example system that includes both real-time and non-real-time transaction tables in a memory controller. Description of a memory subsystem and an SoC follow. A method for operating a memory controller with separate transaction tables for real-time transactions is then described, with the specification concluding with a discussion of an example system.

System with Separate Transaction Tables for Real-Time and Non-Real-Time Transactions:

Turning now to FIG. 1, a block diagram of one embodiment of a system including separate transaction tables for real-time and non-real-time transactions is illustrated. In the embodiment shown, system 100 includes a number of system agents 105. As indicated in the drawing, these agents may be peripheral devices, although the disclosure is not limited in this way. On the contrary, system agents 105 may be any type that can submit memory requests.

System 100 also include memory controller 110. The system agents may submit memory requests to memory controller 110. The requests may be divided into real-time transactions and non-real time transactions. The real-time transactions and the non-real-time transactions may have different QoS levels. In general, the real-time transactions may have stricter latency requirements than the non-real-time transactions, and thus may have correspondingly higher priority levels.

Memory controller 110 includes a real-time transaction table 111 and a non-real-time transaction table 112. Incoming real-time memory requests may be stored in the real-time transaction table 111. Similarly, incoming non-real-time memory requests may be stored in the non-real-time transaction tables. Although not explicitly shown here, memory controller 110 may include logic to separate the real-time requests from the non-real-time requests. For example, circuitry for identifying a request type and configured to route each request to the appropriate transaction table may be included. Embodiments in which the transaction tables also include logic that implements a filter to allow only the appropriate types of request to be stored therein are also possible and contemplated.

The real-time transaction table 111 and the non-real-time transaction table 112 in the embodiment shown are separate entities, and may be implemented in separate and distinct circuit structures. Requests stored in each of these tables may be selected for arbitration. As will be discussed below, each of the transaction tables may include its own unique selection circuitry for selecting requests to be presented for arbitration.

Arbitration circuit 115 in the embodiment shown performs arbitration among the various requests received from the transaction tables. In performing arbitration among the various competing requests, arbitration circuit 115 may be configured to enforce QoS requirements for the real-time transactions received from real-time transaction table 111. Although the status of a transaction as being real-time does not necessarily guarantee it will always win in arbitration, arbitration circuit 115 may nevertheless select a real-time transaction over a non-real-time transaction if selecting the latter would prevent the former from meeting its designated QoS. However, arbitration circuit 115 can select a non-real-time transaction over a real-time transaction in instances when the QoS of the real-time transaction can still be met by selecting at a later time. In this manner, both types of transactions can make forward progress.

Upon completing a round of arbitration, arbitration circuit 115 then conveys the winning transaction into the memory pipeline. The transactions forwarded into the memory pipeline may be read transactions or write transactions. In additional circuitry discussed below, data to be written to memory may be conveyed in parallel with the winning transaction for write transactions. For read transactions, the requested data may be retrieved from memory and stored in a temporary buffer as part of the processing of the transaction.

Figure 2:
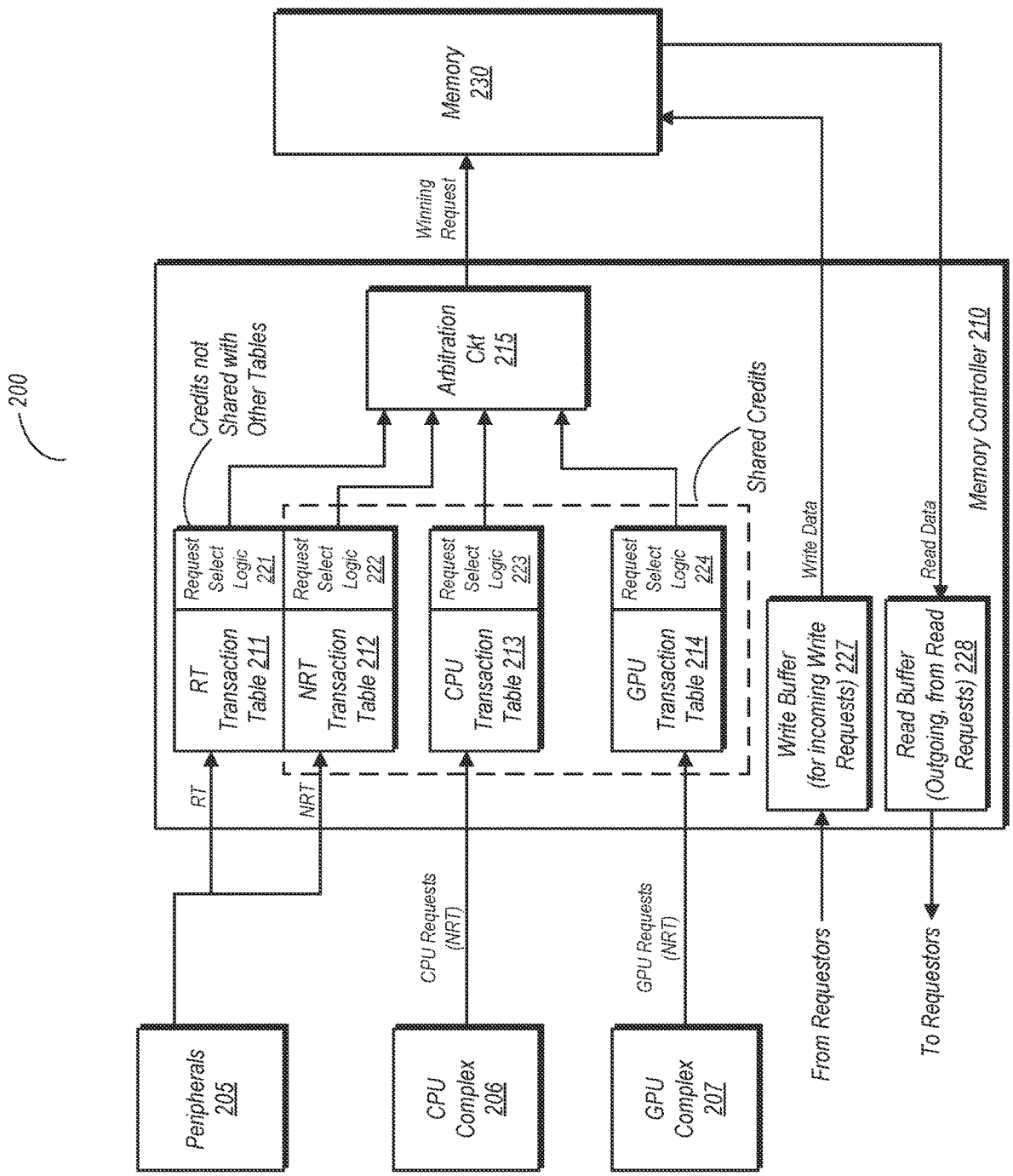
FIG. 2 is a block diagram of one embodiment of a memory subsystem with separate transaction tables for real-time and non-real-time transactions.

Memory Subsystem with Real-Time and Non-Real-Time Transaction Tables:

FIG. 2 is a block diagram of one embodiment of a system including a memory subsystem in accordance with the disclosure. In the embodiment shown, system 200 includes peripherals 205, a central processing unit complex 206, and a graphics processing unit complex 207. Although only a single block is shown, peripheral 205 may represent a plurality of different peripheral devices. Similarly, CPU complex 206 may include a number of CPUs or processor cores. GPU complex 207 may be similarly arranged, including multiple GPUs or may have multiple GPU cores that are each capable of submitting memory requests. These various functional circuits are coupled to a memory subsystem including memory controller 210 and memory 230.

In the embodiment shown, peripherals 205 may submit both real-time and non-real-time memory requests. CPUs in CPU complex 206 and GPUs in GPU complex 207 of the illustrated embodiment may submit non-real-time memory requests in this particular embodiment. However, embodiments are possible and contemplated where these circuit units may in some instances submit real-time memory requests.

Various ones of peripherals 205 may include circuits implemented on the same IC/SoC as memory controller 210, as well as off-chip peripheral devices that communicate through an input/output (I/O) interface. For example, a peripheral device within the scope of this disclosure may be a universal serial bus (USB) interface implemented on-chip, or a USB device that is coupled to the USB interface. More generally, a peripheral device according to the disclosure may be any type of device configured to interact with circuitry on the IC/SoC as well as those interface circuits that support communication with such devices.

Memory controller 210 in the embodiment shown includes a number of different transaction tables. These transaction tables include real-time transaction table 211 and non-real-time transaction table 212, which are coupled to receive real-time and non-real-time memory requests, respectively, from peripherals 205. Memory controller 210 also includes a CPU transaction table 213 and a GPU transaction table 214, which receive incoming requests from CPU complex 206 and GPU complex 207, respectively. In this particular embodiment, the requests receive from CPU complex 206 and GPU complex 207 are non-real-time requests. However, embodiments in which either or both CPU complex 206 and GPU complex 207 are capable of submitting real-time requests to the real-time transaction table are possible and contemplated.

In the embodiment shown, each of the transaction tables has its own, individual selection logic circuit. Requests are selected from real-time transaction table 211 by request logic circuit 221. Similarly, requests are selected from non-real-time transaction table 212, CPU transaction table 213, and GPU transaction table 214 by request select logic circuits 222, 223, and 224, respectively. The request select logic circuits are coupled to arbitration circuit 215. For a given cycle of arbitration, each of the request select logic circuits may select a transaction from its corresponding transaction table to be presented to arbitration circuit 215.

Although requests may be received in a certain order by real-time transaction table 211, request select logic 211 may select request to be presented to the arbitration circuit 215 in a different order. Such out-of-order request selection may be performed for various reasons. For example, a real-time request resulting from an operation which updates the architectural state of a processor may be processed before an older real-time request that does not cause a change of the processor's architectural state. It is also noted that the other selection circuits may also select requests in an order different from that in which they were received.

Arbitration circuit 215 in the embodiment shown is configured to arbitrate among the requests selected from the various transaction tables, with the winning request being forwarded for processing into the memory pipeline. In performing arbitration, arbitration circuit 215 may, in a single arbitration cycle, arbitrate among requests received from each of transaction tables 211-214. However, it is noted that in some cycles, a particular selection circuit may not provide a request from a particular transaction table (e.g., when no requests are pending for a transaction table's respective source). In such cycles, arbitration circuit 215 may thus conduct arbitration among fewer than the maximum possible number of requests. If only a single request is submitted for a given arbitration cycle, that request may be determined to win the arbitration irrespective of its type.

As noted above, arbitration circuit 215 is configured to enforce a QoS policy for real-time transactions. Accordingly, a real-time request presented for arbitration may have priority over non-real-time requests when failure to process the real-time request would cause a violation of the QoS policy. However, when arbitrating among a number of requests, arbitration circuit 215 may in some instances select a non-real-time request over a real-time request when selecting and processing the former still provides enough time to meet the QoS policy for the latter. In this manner, arbitration circuit 215 may allow forward progress on pending non-real-time transactions while still enforcing the QoS policy for real-time transactions.

In the embodiment shown, arbitration circuit 215 performs a credit-based arbitration. In a credit-based arbitration, credits from a pool of credits are consumed when a request is granted. Credits may be returned to the pool when a transaction resulting from a request is completed. In some embodiments, the number of credits for different requests may vary based on the size of the corresponding transaction. In such embodiments, transactions involving a larger amounts of data may consume more credits than those involving smaller amounts. Furthermore, it is noted that multiple transactions may be pending in the memory pipeline at a given time. Based on these factors, it is possible for a pool of credits to be depleted. When depleted, arbitration circuit 215 may inhibit granting of further requests associated with that particular pool of credits. In the embodiment of FIG. 2, non-real-time transaction table 212, CPU transaction table 213, and GPU transaction table 214 share a pool of credits. Meanwhile, real-time transaction table 211 has its own unique, non-shared pool of credits. Providing a separate, non-shared pool of credits to the requests stored in real-time transaction table 211 may help arbitration circuit 215 in enforcing the QoS policy and prioritization of real-time requests over non-real-time requests stored in transaction tables 212-214.

Memory requests in the embodiment shown include requests to write data to and read data from memory 230. Accordingly, memory controller 210 includes a write buffer 227 and a read buffer 228. Write buffer 227 is coupled to receive data from the various requestors (e.g., ones of the peripherals 205, ones of the CPUs in CPU complex 206, etc.). Write buffer 227 provides temporary storage of the data until its corresponding request wins arbitration and is forwarded into the memory pipeline. Thereafter, the data is forwarded to and written into the memory. Write buffer 227 may be implemented using any suitable memory technology and may be arranged to support the ordering protocols followed elsewhere in the memory subsystem (including out-of-order processing of requests). In additional to providing the various storage locations, write buffer 227 may also include logic circuitry to support its operations, including selecting locations to store incoming data as well as circuitry to select data for forwarding to memory 230 to be written thereto.

Read buffer 228 in the embodiment shown is configured to provide temporary storage of data that is read from memory 230 in response to a processed read request. Data read from memory 230 may be temporarily stored in read buffer 228 and subsequently forwarded to its requestor. Read buffer 228 may be similarly arranged as is write buffer 227, including in its ability to support various ordering protocols that may be implemented in the system. Accordingly, in some embodiments, data that is temporarily stored in read buffer 228 may be forwarded to its respective requestor in an order different from that which it is read from memory 230. For example, data associated with a real-time request may be forwarded to its respective requestor from read buffer 228 ahead of data read from memory 230 that is associated with a non-real-time request. As with write buffer 227, read buffer 228 may include both the storage locations for storing data as well as the logic circuitry to support its various operations.

Figure 3:
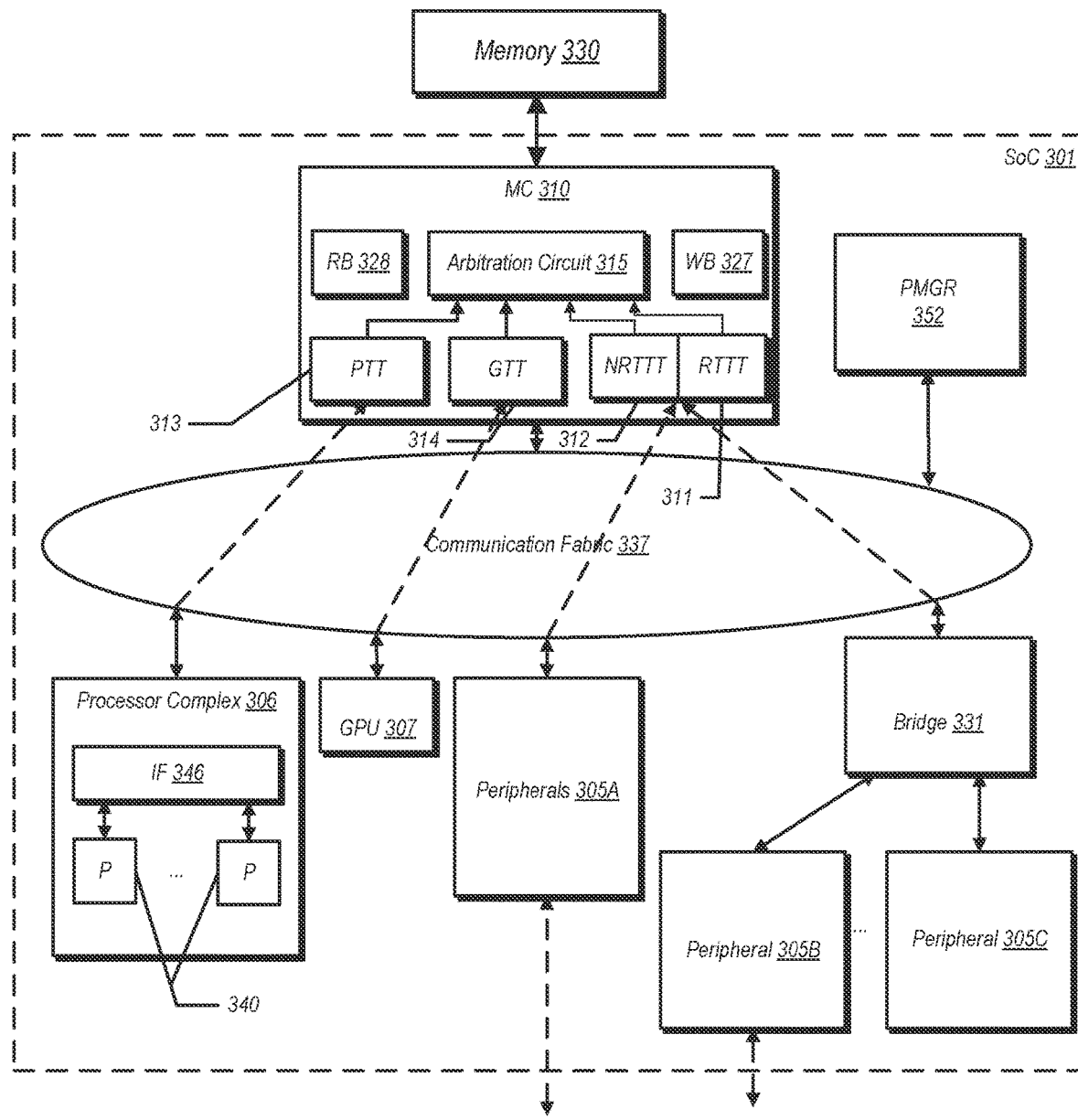
FIG. 3 is a block diagram of one embodiment of a system-on-a-chip (SoC).

SoC with Memory Subsystem:

FIG. 3 is a block diagram of one embodiment of an SoC. While an SoC embodiment is used as an example here, systems comprising multiple integrated circuits coupled to a communication fabric may be used in other embodiments. In FIG. 3, the SoC 301 is coupled to a memory 330. As implied by the name, the components of the SoC 301 may be integrated onto a single semiconductor substrate as an integrated circuit "chip." In the illustrated embodiment, the components of the SoC 301 include at least one processor cluster 306, at least one graphics processing unit (GPU) 307, one or more peripheral components such as peripheral components 305A-305C (more briefly, "peripherals"), a bridge circuit 331 (more briefly "bridge" 331), a memory controller 310, a power manager circuit (PMGR) 352, and a communication fabric 337. The components 306, 307, 305A, 331, 310, and 352 may all be coupled to the communication fabric 337. The components 305B and 305C may be coupled to the communication fabric 337 through the bridge 331. The memory controller 310 may be coupled to the memory 330 during use. In some embodiments, there may be more than one memory controller coupled to a corresponding memory. The memory address space may be mapped across the memory controllers in any desired fashion in such embodiments. In the illustrated embodiment, the processor cluster 306 may include a plurality of processors (P) 340. The processors 340 may form the central processing units (CPU(s)) of the SoC 301.

Memory controller 310 may generally include the circuitry for receiving memory operations from the other components of the SoC 301 and for accessing the memory 330 to complete the memory operations. The memory controller 310 may be configured to access any type of memory 330. For example, the memory 330 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g., LPDDR, mDDR, etc.). The memory controller 310 may include queues for memory operations, for ordering (and potentially reordering) the operations and presenting the operations to the memory 330. The memory controller 310 may further include data buffers to store write data awaiting write to memory and read data awaiting return to the source of the memory operation. In some embodiments, the memory controller 310 may include a memory cache to store recently accessed memory data. In SoC implementations, for example, the memory cache may reduce power consumption in the SoC by avoiding re-access of data from the memory 330 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 310.

The memory controller 310 in the embodiment shown includes transaction tables, including real-time transaction table 311, non-real-time transaction table 312, processor transaction table 313, and graphics transaction table 314. These tables may store incoming memory requests in a manner similar to that described above with respect to the embodiment of FIG. 2, including separating real-time requests and non-real-time requests and storing them in separate transaction tables. Although not explicitly shown in FIG. 3, each of the transaction tables 311-314 includes a respective selection logic circuit from which requests are selected from that table and presented for arbitration.

Memory controller 310 in the embodiment shown also includes an arbitration circuit 315 that performs arbitration among the requests that were selected and presented from the various ones of transaction tables 311-314. Arbitration circuit 315 may perform arbitration to ensure that transactions meet their respective QoS protocols. This includes giving priority to real-time requests over non-real time requests when necessary to meet latency requirement in for such transactions.

Read buffer 328 and write buffer 327 are also included in memory controller 310. Read buffer 328 is configured to store data that is read from memory 330 as a result of a requested and processed memory transaction. This data may then be forwarded to its requesting agent, which may be one of the various functional circuits shown in FIG. 3. Write buffer 327 is configured to store data that is to be written to memory 330 as part of a requested transaction that is still pending. The data may be received from any one of the various functional circuits shown in FIG. 3 that is capable of interacting with memory. The data may be forwarded from write buffer 327 when the corresponding requested transaction wins arbitration and is processed by memory controller 310.

The peripherals 305A-305C (collectively, peripherals 305) may be any set of additional hardware functionality included in the SoC 301. For example, the peripherals 305 may include video peripherals such as an image signal processor configured to process image capture data from a camera or other image sensor, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include interface controllers for various interfaces external to the SoC 301 including interfaces such as Universal Serial Bus (USB), peripheral component interconnect (PCI) including PCI Express (PCIe), serial and parallel ports, etc. The interconnection to external device is illustrated by the dashed arrow in FIG. 3 that extends external to the SoC 301. The peripherals may include networking peripherals such as media access controllers (MACs). Any set of hardware may be included.

Communication fabric 337 in the illustrated embodiment provides connections between the various functional circuits implemented on SoC 301. In one embodiment, fabric 337 includes appropriate circuitry for implementation of a network-on-a-chip (NoC), and supports packet-based communication between the various functional circuits. Various data links within communication fabric 337 may operate concurrently. Accordingly, a number of packets may be in transit through communication fabric 337 at any given time. Furthermore, the topology of communication fabric 337 in the embodiment shown is arranged to support QoS requirements for various transaction types, including real-time transactions.

More generally, communication fabric 337 may be any communication interconnect and protocol for communicating among the components of the SoC 301. The communication fabric 337 may be bus-based, including shared bus configurations, cross bar configurations, and hierarchical buses with bridges. The communication fabric 337 may also be packet-based, and may be hierarchical with bridges, cross bar, point-to-point, or other interconnects.

Bridge 331 may bridge communications between the peripherals 305B-305C and the communication fabric 337. For example, the peripherals 305B-305C may be designed to communicate using a different interconnect than the communication fabric 337, and the bridge 331 may be configured to generate communications as defined on the communication fabric 337 to complete communications from the peripherals 305B-305C. When communications are received on the communication fabric 337 directed to the peripherals 305B-305C, the bridge 331 may generate corresponding communications on the interconnect to the peripherals 305B-305C. In other embodiments, the peripherals 305B-305C may implement the interface and protocol specified by the communication fabric 337, but the bridge 331 may be a gathering point for the transactions from the peripherals 305B-305C. For example, the peripherals 305B-305C may be relatively low bandwidth peripherals and concentrating the traffic via a bridge 331 may reduce the number of inputs to the communication fabric 337.

PMGR 352 may be configured to control the supply voltage magnitudes requested from an external power management unit (PMU). There may be multiple supply voltages generated by a PMU (not shown) for SoC 301. For example, there may be a supply voltage for the processor cluster 306 and at least one supply voltage for the rest of the SoC 301 outside of the processor cluster 306. In an embodiment, the same supply voltage may serve components of the SoC 301 outside of the processor cluster 306 and power gating may be employed based to control one or more independent power domains served by the power supply voltage. There may be multiple supply voltages for the rest of the SoC 301, in some embodiments. Embodiments are also possible and contemplated in which there is a memory supply voltage for various memory arrays in the processor cluster 306 and/or the SoC 301. The memory supply voltage may be used with the voltage supplied to the logic circuitry, which may have a lower voltage magnitude than that required to ensure robust memory operation. The PMGR 352 may be under direct software control (e.g., software may directly request the power up and/or power down of components) and/or may be configured to monitor the SoC 301 and determine when various components are to be powered up or powered down. Various power states within a component (e.g., power states of the processors 340) may be controlled via the PMGR 352, as well as the sequencing of changes to power states, different request voltage and frequencies, etc.

In controlling the power states of the various functional circuits in SoC 301, PMGR 352 may (or may cause) changes to supply voltages well as frequencies of clock signals provided to the various clock consumers implemented on SoC 301. For example, the processors 340 may be capable of operating in a number of different power states, each of which includes a combination of supply voltage and clock frequency that is unique with respect to the other power states. Accordingly, PMGR 352 may set the various ones of processors 340 in a particular power state based on information such as performance demand, thermal output, power consumption, and so on. Accordingly, PMGR 352 may control the power states of the various components of SoC 301 in order to optimize performance while remaining within power consumption and thermal output limits of the particular design.

Processor cluster 306 may include one or more processors 340 that may serve as the CPU of the SoC 301. The CPU of the system includes the processor(s) that execute the main control software of the system, such as an operating system. Generally, software executed by the CPU during use may control the other components of the system to realize the system's desired functionality. The processors may also execute other software, such as application programs. The application programs may provide user functionality, and may rely on the operating system for lower-level device control, scheduling, memory management, etc. Accordingly, the processors may also be referred to as application processors.

Generally, a processor may include any circuitry and/or microcode configured to execute instructions defined in an instruction set architecture implemented by the processor. Processors may encompass processor cores implemented on an integrated circuit with other components as a system on a chip (e.g., SoC 301) or other levels of integration. Processors may further encompass discrete microprocessors, processor cores and/or microprocessors integrated into multichip module implementations, processors implemented as multiple integrated circuits, etc.

An interface circuit 346 is coupled to the processors 340 in the illustrated embodiment. Interface circuit 346 may be configured to issue transactions generated by the processors 340 on the communication fabric 337. The interface circuit 346 may include a last level cache, in some embodiments. There may be similar interface circuits in other agents 307, 305A-305B, and 310 which may couple to the communication fabric 337.

It is noted that the number of components of the SoC 301 (and the number of subcomponents for those shown in FIG. 3, such as the processors 340 in each processor cluster 306 may vary from embodiment to embodiment. Additionally, the number of processors 340 in one processor cluster 306 may differ from the number of processors 340 in another processor cluster 306 when multiple processor clusters are included. There may be more or fewer of each component/subcomponent than the number shown in FIG. 3.

Figure 4:
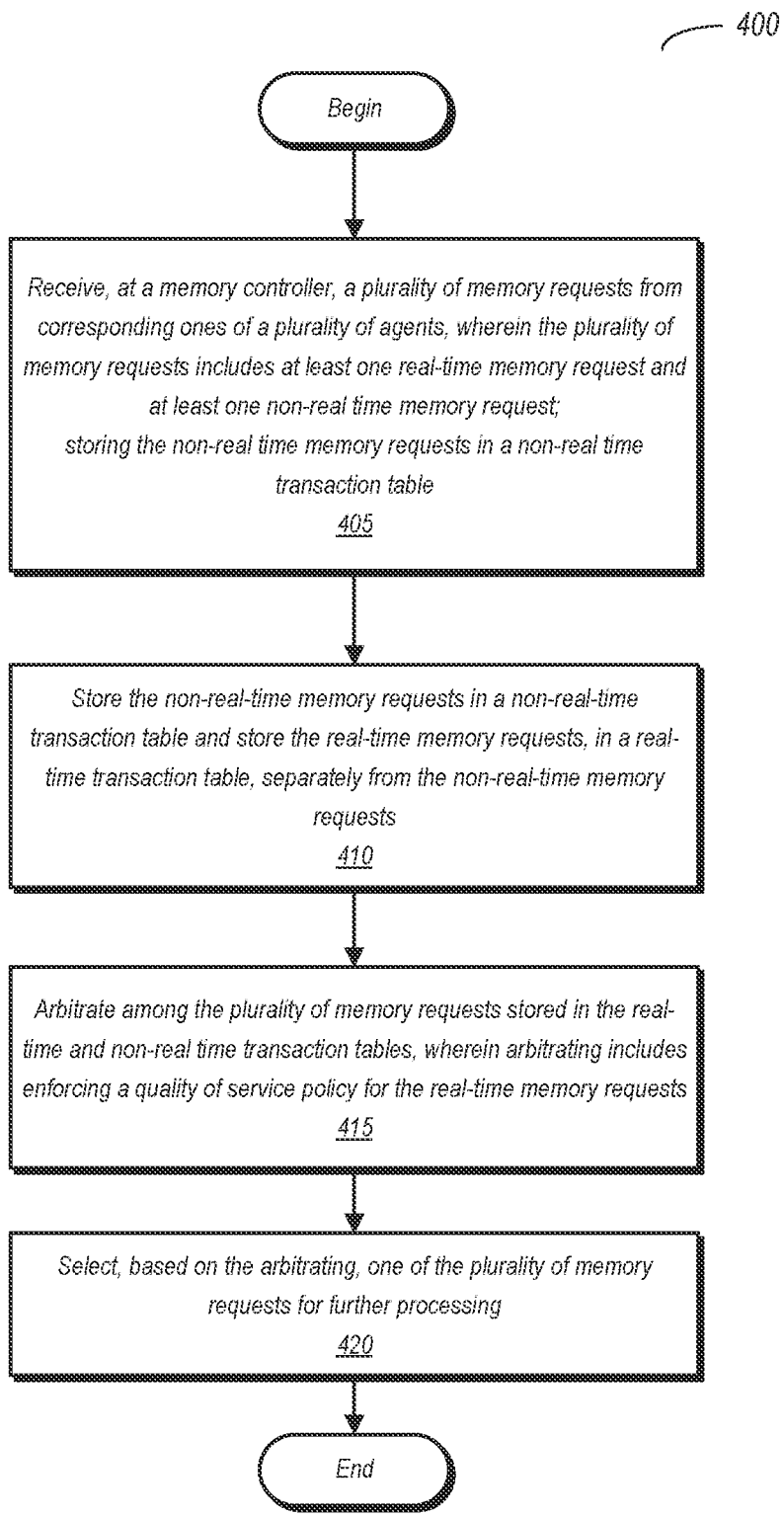
FIG. 4 is a flow diagram of one embodiment of a method for operating a memory controller.

Method for Operating a Memory Subsystem with Real-Time and Non-Real Time Transaction Tables:

FIG. 4 is a flow diagram of one embodiment of a method for operating a memory controller. Method 400 as discussed herein may be carried out by any of the various hardware embodiments discussed above. Furthermore, hardware embodiments not explicitly discussed herein but otherwise capable of carrying out Method 400 are considered to fall within the scope of this disclosure.

Method 400 includes receiving, at a memory controller, a plurality of memory requests from corresponding ones of a plurality of agents, wherein the plurality of memory requests includes at least one real-time memory request and at least one non-real-time memory request (block 405). The method further includes storing the non-real-time memory requests in a non-real-time transaction table and storing the real-time memory requests, in a real-time transaction table, separately from the non-real-time memory requests (block 410). The method continues with arbitrating among the plurality of memory requests stored in the real-time and non-real-time transaction tables, wherein arbitrating includes enforcing a quality of service policy for the real-time memory requests (block 415). Thereafter, the method includes selecting, based on the arbitrating, one of the plurality of memory requests for further processing (block 420).

In various embodiments, the method includes a real-time selection circuit selecting, for arbitration, real-time memory requests from the real-time transaction table and a non-real-time selection circuit (separate and distinct from the real-time selection circuit) selecting, for arbitration, non-real-time memory requests from the non-real-time transaction table. Such embodiments may also include the real-time selection circuit selecting, for arbitration, real-time memory requests in an order different from that in which they were received by the real-time transaction table.

The ones of the plurality of agents are, in various embodiments, peripheral devices. The system may also include one or more processors and one or more graphics processing units. Accordingly, embodiments of the method may also include storing incoming memory requests from at least one processor in a processor transaction table, and storing incoming memory requests from at least one graphics processing unit in a graphics transaction table.

Various embodiments of the method comprise performing a credit-based arbitration. These embodiments may includes sharing a first pool of credits between the non-real-time transaction table, the processor transaction table, and the graphics transaction table and providing a second, separate pool of credits for the real-time transaction table. Accordingly, such embodiments may also include performing a credit-based arbitration among the real-time transaction table, the non-real time transaction table, the processor transaction table, and the graphics transaction table.

As noted above, an arbitration circuit may enforce a quality of service policy for the real-time memory requests. Accordingly, enforcing the quality of service policy for the real-time memory requests comprises prioritizing real-time memory requests over memory requests stored in the non-real-time transaction table, the processor transaction table, and the graphics transaction table.

Memory requests may include read requests (e.g., to read data from memory) and write requests (e.g., to write data to memory). Accordingly, method embodiments may include a write buffer storing data for incoming memory requests for which data is to be written to a memory by the memory controller and a read buffer storing data for memory requests for which data has been read from the memory by the memory controller.

Example System

Figure 5:
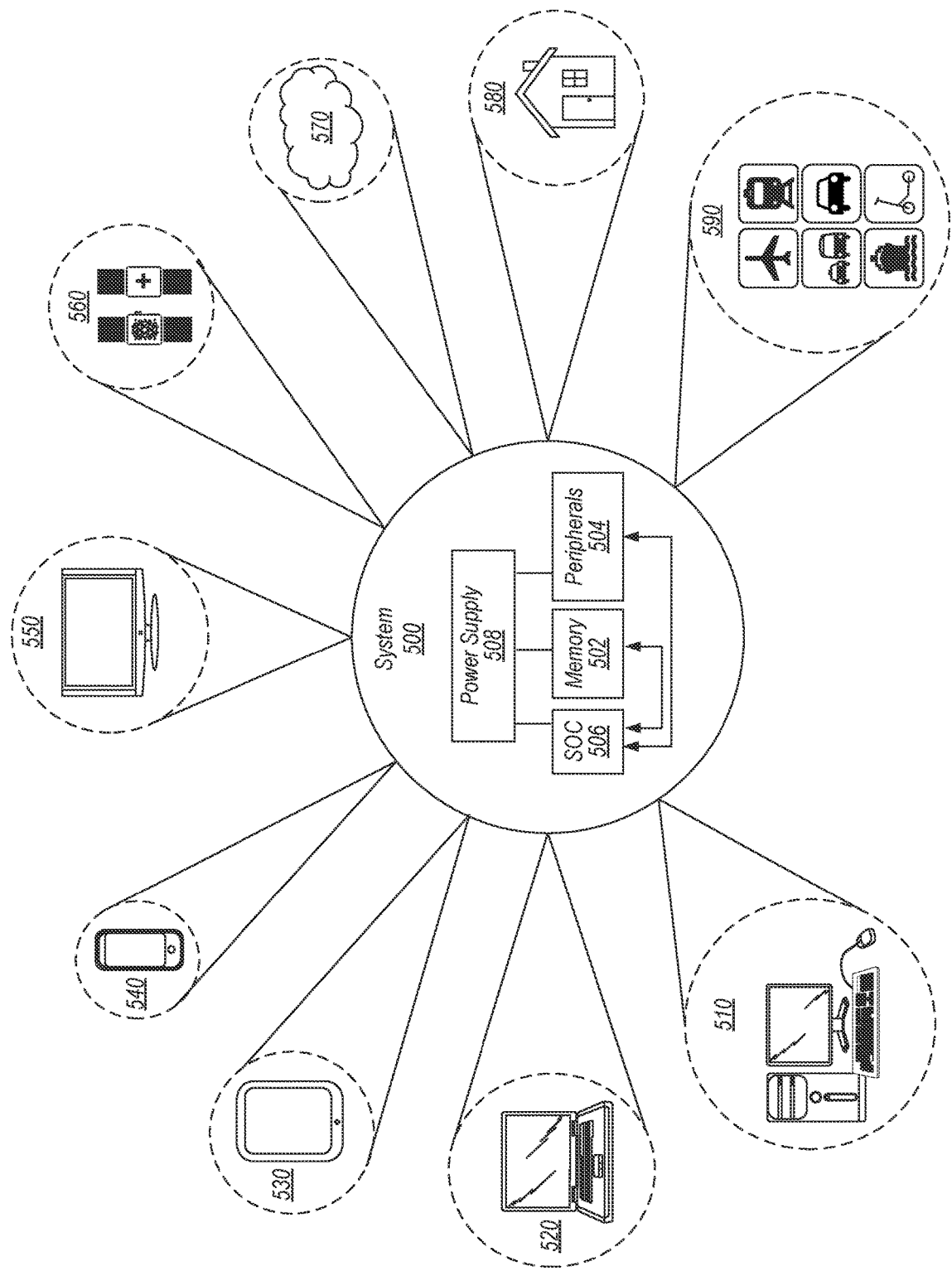
FIG. 5 is a block diagram of one embodiment of an example system.

Turning next to FIG. 5, a block diagram of one embodiment of a system 500 is shown that may incorporate and/or otherwise utilize the methods and mechanisms described herein. In the illustrated embodiment, the system 500 includes at least one instance of a system on chip (SoC) 506 which may include multiple types of processing units, such as a central processing unit (CPU), a graphics processing unit (GPU), or otherwise, a communication fabric, and interfaces to memories and input/output devices. In some embodiments, one or more processors in SoC 506 includes multiple execution lanes and an instruction issue queue. In various embodiments, SoC 506 is coupled to external memory 502, peripherals 504, and power supply 508.

A power supply 508 is also provided which supplies the supply voltages to SoC 506 as well as one or more supply voltages to the memory 502 and/or the peripherals 504. In various embodiments, power supply 508 represents a battery (e.g., a rechargeable battery in a smart phone, laptop or tablet computer, or other device). In some embodiments, more than one instance of SoC 506 is included (and more than one external memory 502 is included as well).

The memory 502 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration. Memory 502 may be part of a memory subsystem that includes a memory controller that controls memory accesses. In various embodiments, the memory controller of such a memory subsystem may include transaction tables for storing information on incoming transactions. The transaction tables may include a separate table for storing incoming real-time transactions, as well as separate logic for selecting transactions from that table for presentation to an arbitration circuit. The arbitration circuit of such an embodiment may be configured to enforce QoS parameters for the real-time transactions, giving them priority over non-real-time transactions when necessary to meet latency requirements.

The peripherals 504 include any desired circuitry, depending on the type of system 500. For example, in one embodiment, peripherals 504 includes devices for various types of wireless communication, such as Wi-Fi, Bluetooth, cellular, global positioning system, etc. In some embodiments, the peripherals 504 also include additional storage, including RAM storage, solid state storage, or disk storage. The peripherals 504 include user interface devices such as a display screen, including touch display screens or multi-touch display screens, keyboard or other input devices, microphones, speakers, etc.

As illustrated, system 500 is shown to have application in a wide range of areas. For example, system 500 may be utilized as part of the chips, circuitry, components, etc., of a desktop computer 510, laptop computer 520, tablet computer 530, cellular or mobile phone 540, or television 550 (or set-top box coupled to a television). Also illustrated is a smartwatch and health monitoring device 560. In some embodiments, smartwatch 560 may include a variety of general-purpose computing related functions. For example, smartwatch 560 may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 500 may further be used as part of a cloud-based service(s) 570. For example, the previously mentioned devices, and/or other devices, may access computing resources in the cloud (i.e., remotely located hardware and/or software resources). Still further, system 500 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 5 is the application of system 500 to various modes of transportation. For example, system 500 may be used in the control and/or entertainment systems of aircraft, trains, buses, cars for hire, private automobiles, waterborne vessels from private boats to cruise liners, scooters (for rent or owned), and so on. In various cases, system 500 may be used to provide automated guidance (e.g., self-driving vehicles), general systems control, and otherwise. These any many other embodiments are possible and are contemplated. It is noted that the devices and applications illustrated in FIG. 5 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed. FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus comprising:
a plurality of agents;
a memory controller configured to receive real-time and non-real-time memory requests from ones of the plurality of agents, wherein the memory controller having a plurality of transaction tables that includes:
a real-time transaction table configured to store those memory requests, received from a subset of the plurality of agents, that are real-time memory requests;
a non-real-time transaction table configured to store those memory requests, received from the subset of the plurality of agents, that are non-real-time memory requests;
one or more additional transaction tables, wherein a given one of the one or more additional transaction tables is configured to store memory requests initiated by a corresponding processing circuit; and
wherein the memory controller further includes an arbitration circuit configured to select a memory request from among memory requests stored in the real-time and non-real-time transaction tables and further configured to enforce a quality of service policy for the real-time memory requests, wherein the arbitration circuit is configured to perform a credit-based arbitration, wherein the non-real-time transaction table and the additional transaction tables share a pool of credits, and wherein the real-time transaction table does not share credits with other ones of the plurality of transaction tables;
wherein the memory controller is configured to, in response to the arbitration circuit selecting a particular memory request, execute the particular memory request in a memory pipeline.

2. The apparatus of claim 1, further comprising a real-time selection circuit configured to select real-time memory requests, for arbitration, from the real-time transaction table, and a non-real-time selection circuit configured to select non-real-time memory requests for arbitration from the non-real-time transaction table.

3. The apparatus of claim 2, wherein the real-time selection circuit is configured to select at least some real-time requests for arbitration in an order different from that which they were received.

4. The apparatus of claim 1, wherein the plurality of agents comprise one or more peripheral circuits of a computer system, and wherein the the one or more additional transaction tables include a processor transaction table configured to store incoming memory requests from at least one central processing unit and a graphics transaction table configured to store incoming memory requests from at least one graphics processing unit.

5. The apparatus of claim 4, wherein the arbitration circuit is configured to arbitrate among memory requests from the plurality of transaction tables.

6. The apparatus of claim 4, wherein, in enforcing the quality of service policy for the real-time memory requests, the arbitration circuit is configured to prioritize real-time memory requests over memory requests stored in the non-real-time transaction table, the processor transaction table, and the graphics transaction table.

7. The apparatus of claim 1, wherein the memory requests include write requests, and wherein the apparatus further includes at least one write buffer configured to provide temporary storage of data corresponding to incoming memory write requests.

8. The apparatus of claim 1, wherein the memory requests include read requests, and wherein the memory controller further comprises at least one read buffer configured to provide temporary storage of data read from memory in response to corresponding read requests.

9. A method comprising
receiving, at a memory controller, a plurality of memory requests from corresponding ones of a plurality of agents, wherein the plurality of memory requests includes at least one real-time memory request and at least one non-real-time memory request;
storing the non-real-time memory requests in a non-real-time transaction table;
storing the real-time memory requests, in a real-time transaction table, separately from the non-real-time memory requests;
storing, in one or more additional transaction tables, memory requests initiated by one or more processing circuits;
arbitrating among the plurality of memory requests stored in the real-time and non-real-time transaction tables, wherein arbitrating includes enforcing a quality of service policy for the real-time memory requests, wherein the arbitrating comprises:
sharing a first pool of credits between the non-real-time transaction table, the one or more additional transaction tables;
providing a second, separate pool of credits for the real-time transaction table; and
performing a credit-based arbitration among the real-time transaction table, the non-real time transaction table, the one or more additional transaction tables;
selecting, based on the arbitrating, one of the plurality of memory requests for further processing; and
executing, by the memory controller, the one of the plurality of memory requests in a memory pipeline.

10. The method of claim 9, further comprising:
a real-time selection circuit selecting, for arbitration, real-time memory requests from the real-time transaction table; and
a non-real-time selection circuit selecting, for arbitration, non-real-time memory requests from the non-real-time transaction table.

11. The method of claim 10, further comprising the real-time selection circuit selecting, for arbitration, at least some real-time memory requests in an order different from that in which they were received by the real-time transaction table.

12. The method of claim 9, wherein the ones of the plurality of agents are peripheral devices, wherein the one or more processing circuits includes a central processing unit and a graphics processing unit, and wherein the method further comprises:
storing incoming memory requests from the central processing unit in a processor transaction table of the one or more additional transaction tables; and
storing incoming memory requests from the graphics processing unit in a graphics transaction table of the one or more additional transaction tables.

13. The method of claim 12, wherein enforcing the quality of service policy for the real-time memory requests comprises prioritizing real-time memory requests over memory requests stored in the non-real-time transaction table, the processor transaction table, and the graphics transaction table.

14. The method of claim 9, further comprising:
storing data, in a write buffer, for incoming memory requests for which data is to be written to a memory by the memory controller; and
storing data, in a read buffer, for memory requests for which data has been read from the memory by the memory controller.

15. A system comprising:
a plurality of agents configured to generate memory access requests, wherein the memory access requests include real-time requests and non-real-time requests;
a memory subsystem including a memory and a memory controller configured to receive the memory access requests from ones of the plurality of agents, wherein the memory controller includes:
a non-real-time transaction table configured to store incoming non-real-time requests received from ones of the plurality of agents;
a non-real-time selection circuit configured to select ones of the non-real-time requests from the non-real-time transaction table;
a real-time transaction table configured to store, separately from the non-real-time requests, incoming real-time requests; and
a real-time selection circuit configured to select ones of the real-time requests from the real-time transaction table;
a processor transaction table configured to store incoming memory access requests received from one or more processors;
a graphics transaction table configured to store incoming memory access requests received from one or more graphics processing units; and
an arbitration circuit configured to select a memory request from among memory access requests stored in the real-time and non-real-time transaction tables, the processor transaction table, and the graphics transaction table, wherein the arbitration circuit is configured to perform a credit-based arbitration, and wherein the non-real-time transaction table, the processor transaction table, and the graphics transaction table share a first pool of credits, and wherein a second pool of credits is reserved exclusively to the real-time transaction table;
wherein the memory controller is configured to, in response to the arbitration circuit selecting a particular memory access request, execute the particular memory access request in the memory subsystem.

16. The system of claim 15, wherein the arbitration circuit is configured to enforce a quality of service policy for the real-time memory requests.

17. The system of claim 16, wherein, in enforcing the quality of service policy for the real-time memory requests, the arbitration circuit is configured to prioritize real-time memory requests over memory requests stored in the non-real-time transaction table, the processor transaction table, and the graphics transaction table.

18. The system of claim 15, wherein the memory access requests include read requests and write requests, and wherein the memory controller further includes:
a read data buffer configured to store data associated with read requests; and
a write data buffer configured to store data associated with write requests.

* * * * *